United States Patent
Park et al.

(10) Patent No.: US 12,463,209 B2
(45) Date of Patent: Nov. 4, 2025

(54) NEGATIVE ELECTRODE AND SECONDARY BATTERY INCLUDING THE SAME

(71) Applicant: LG ENERGY SOLUTION, LTD., Seoul (KR)

(72) Inventors: Se Mi Park, Daejeon (KR); Yong Ju Lee, Daejeon (KR); Su Min Lee, Daejeon (KR); Dong Hyuk Kim, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 532 days.

(21) Appl. No.: 17/771,107

(22) PCT Filed: Dec. 17, 2020

(86) PCT No.: PCT/KR2020/018532
§ 371 (c)(1),
(2) Date: Apr. 22, 2022

(87) PCT Pub. No.: WO2021/125825
PCT Pub. Date: Jun. 24, 2021

(65) Prior Publication Data
US 2022/0367864 A1    Nov. 17, 2022

(30) Foreign Application Priority Data
Dec. 17, 2019 (KR) .......... 10-2019-0169171

(51) Int. Cl.
*H01M 4/48* (2010.01)
*H01M 4/02* (2006.01)
(Continued)

(52) U.S. Cl.
CPC ......... *H01M 4/483* (2013.01); *H01M 4/5825* (2013.01); *H01M 2004/021* (2013.01);
(Continued)

(58) Field of Classification Search
CPC .... H01M 4/483; H01M 4/5825; H01M 4/362; H01M 4/364; H01M 4/366; H01M 4/625;
(Continued)

(56) References Cited

U.S. PATENT DOCUMENTS

2010/0124707 A1   5/2010  Hirose et al.
2011/0244334 A1   10/2011 Kawada
(Continued)

FOREIGN PATENT DOCUMENTS

CN   102214823 A   10/2011
CN   104736479 A   6/2015
(Continued)

OTHER PUBLICATIONS

Malvern Pananalytical: "Morphologu 4range-Automated Imaging for advanced particle characterisation", Jan. 1, 2017 (Jan. 1, 2017), xp093087315, p. 15.
(Continued)

*Primary Examiner* — Matthew W Van Oudenaren
(74) *Attorney, Agent, or Firm* — Bryan Cave Leighton Paisner LLP

(57) ABSTRACT

Provided are a negative electrode, which includes a current collector and a negative electrode active material layer disposed on the current collector, wherein the negative electrode active material layer includes a conductive material, a negative electrode active material, and a binder, the negative electrode active material includes a silicon-based active material having a convexity of 0.8 or more as measured using a particle shape analyzer, and the convexity is defined by the following Formula 1, and a secondary battery including the negative electrode.

Convexity($C_x$)=Convex hull perimeter($P_c$)/Actual perimeter($P$)    [Formula 1]

10 Claims, 1 Drawing Sheet

(51) Int. Cl.
  *H01M 4/131* (2010.01)
  *H01M 4/134* (2010.01)
  *H01M 4/36* (2006.01)
  *H01M 4/38* (2006.01)
  *H01M 4/58* (2010.01)
  *H01M 4/62* (2006.01)
  *H01M 10/052* (2010.01)
  *H01M 10/0525* (2010.01)

(52) U.S. Cl.
  CPC ...... *H01M 2004/027* (2013.01); *H01M 4/131* (2013.01); *H01M 4/134* (2013.01); *H01M 4/362* (2013.01); *H01M 4/364* (2013.01); *H01M 4/366* (2013.01); *H01M 4/386* (2013.01); *H01M 4/625* (2013.01); *H01M 10/052* (2013.01); *H01M 10/0525* (2013.01)

(58) Field of Classification Search
  CPC ...... H01M 4/386; H01M 4/131; H01M 4/134; H01M 2004/021; H01M 2004/027; H01M 10/0525; H01M 10/052
  See application file for complete search history.

(56) References Cited

U.S. PATENT DOCUMENTS

| | | | |
|---|---|---|---|
| 2012/0270103 A1* | 10/2012 | Lee | H01M 4/621 429/211 |
| 2014/0023928 A1* | 1/2014 | Jeon | H01M 4/38 241/23 |
| 2014/0377456 A1 | 12/2014 | Kawada | |
| 2015/0280223 A1 | 10/2015 | Chang et al. | |
| 2016/0190554 A1* | 6/2016 | Watanabe | H01M 4/625 427/8 |
| 2017/0141381 A1 | 5/2017 | Hirose et al. | |
| 2017/0170468 A1 | 6/2017 | Kawada | |
| 2018/0040884 A1 | 2/2018 | Kawada | |
| 2018/0269475 A1 | 9/2018 | Oh et al. | |
| 2021/0184204 A1* | 6/2021 | Oh | H01M 4/04 |
| 2023/0025365 A1 | 1/2023 | Nakada et al. | |

FOREIGN PATENT DOCUMENTS

| | | |
|---|---|---|
| CN | 105210217 A | 12/2015 |
| CN | 108630887 A | 10/2018 |
| CN | 109411730 A | 3/2019 |
| EP | 2930146 | 10/2015 |
| JP | 2010-140885 A | 6/2010 |
| JP | 2011-222153 A | 11/2011 |
| JP | 2014-225347 A | 12/2014 |
| JP | 6168051 B2 | 7/2017 |
| JP | 2018-156922 A | 10/2018 |
| JP | 2019-121499 A | 7/2019 |
| JP | 2021-91574 A | 6/2021 |
| KR | 10-2014-0012351 A | 2/2014 |
| KR | 10-2019-0051375 A | 5/2019 |
| WO | 2014/088187 A1 | 6/2014 |
| WO | 2016/152718 A1 | 9/2016 |
| WO | WO2019108050 * | 6/2019 |
| WO | 2019/220576 A1 | 11/2019 |
| WO | WO2019220576 * | 11/2019 |

OTHER PUBLICATIONS

International Search Report (with partial English translation) and Written Opinion issued in corresponding International Patent Application No. PCT/KR2020/018532 dated Mar. 23, 2021.

* cited by examiner

NEGATIVE ELECTRODE AND SECONDARY BATTERY INCLUDING THE SAME

CROSS-REFERENCE TO RELATED APPLICATION

This application claims priority to and the benefit of Korean Patent Application No. 10-2019-0169171, filed on Dec. 17, 2019, the disclosure of which is incorporated herein by reference in its entirety.

TECHNICAL FIELD

Technical Field

The present invention relates to a negative electrode having excellent initial efficiency and excellent lifetime characteristics and a secondary battery including the negative electrode.

Background Art

With a dramatic increase in the use of fossil fuels, there is an increasing demand for use of alternative energy or clean energy, and power generation and accumulation fields using electrochemical reactions have been most actively studied to meet the increasing demand.

A representative example of the electrochemical device using electrochemical energy includes secondary batteries, and an application area thereof is gradually expanding. Recently, as technology development and demand for portable devices such as portable computers, mobile phones, cameras, and the like increase, demand for secondary batteries as energy sources is sharply increasing.

Secondary batteries generally consist of a positive electrode, a negative electrode, an electrolyte, and a separator. The negative electrode includes a negative electrode active material that allows lithium ions released from the positive electrode to be intercalated and deintercalated.

Meanwhile, to increase battery capacity, a silicon-based active material, for example, SiOx (0≤x≤2), has been commonly used as a negative electrode active material. A conventionally used silicon-based active material has a rough particle surface and thus exhibits a low convex surface value. Accordingly, a specific surface area of the silicon-based active material, at which a reaction with an electrolyte solution may take place, increases, and thus side reactions with an electrolyte solution excessively take place, leading to the low initial efficiency and deteriorated lifetime characteristics of the battery.

Therefore, a new type of a negative electrode capable of implementing a secondary battery excellent in initial efficiency and lifetime characteristics is required.

DISCLOSURE

Technical Problem

The present invention is directed to providing a negative electrode including a silicon-based active material capable of improving initial efficiency and lifetime characteristics.

However, the objective of the present invention is not limited to the objective described above, and other objectives not described above will be clearly understood by those skilled in the art from the following description.

Technical Solution

One aspect of the present invention provides a negative electrode which includes a current collector and a negative electrode active material layer disposed on the current collector, wherein the negative electrode active material layer includes a conductive material, a negative electrode active material, and a binder, the negative electrode active material includes a silicon-based active material having a convexity of 0.8 or more as measured using a particle shape analyzer, and the convexity is defined by the following Formula 1.

Convexity($C_x$)=Convex hull perimeter($P_c$)/Actual perimeter($P$)     [Formula 1]

Another aspect of the present invention provides a secondary battery including the above-described negative electrode.

Advantageous Effects

Since a negative electrode according to an embodiment of the present invention includes a silicon-based active material having a convexity of 0.8 or more, few side reactions with an electrolyte solution take place on the surface of the silicon-based active material during operation of a battery, and thus the battery can be suppressed from being damaged due to the excessive volume expansion of the silicon-based active material. Accordingly, the initial efficiency and lifetime characteristics of the negative electrode and the battery can be improved.

MODES OF THE INVENTION

Hereinafter, the present invention will be described in more detail to facilitate understanding of the present invention.

Terms and words provided herein should not be interpreted as limited to commonly used meanings or meanings in dictionaries and should be interpreted with meanings and concepts which are consistent with the technological scope of the invention based on the principle that the inventors can appropriately define concepts of terms in order to describe the invention in the best way.

The terminology provided herein is merely used for the purpose of describing exemplary embodiments, and is not intended to be limiting of the present invention. The singular forms "a," "an," and "the" are intended to include the plural forms as well, unless the context clearly indicates otherwise.

It should be understood that the terms "comprises," "comprising," "includes," "including," "has," and/or "having," when used herein, specify the presence of stated features, integers, steps, components, and/or combinations thereof, but do not preclude the presence or addition of one or more other features, integers, steps, components, and/or combinations thereof.

In the present invention, $D_{50}$ may be defined as a particle diameter corresponding to 50% of the cumulative volume in a particle size distribution curve (curve on the graph of a particle size distribution). The $D_{50}$ may be measured, for example, using a laser diffraction method. The laser diffraction method generally allows the measurement of a particle diameter ranging from a submicron level to several millimeters and may produce a result having high reproducibility and high resolution.

<Negative Electrode>

A negative electrode according to an embodiment of the present invention includes a current collector and a negative electrode active material layer disposed on the current collector, wherein the negative electrode active material layer includes a conductive material, a negative electrode active material, and a binder, the negative electrode active material includes a silicon-based active material having a convexity of 0.8 or more as measured using a particle shape analyzer, and the convexity is defined by the following Formula 1.

Convexity($C_x$)=Convex hull perimeter($P_c$)/Actual perimeter($P$)     [Formula 1]

Figure 1A:
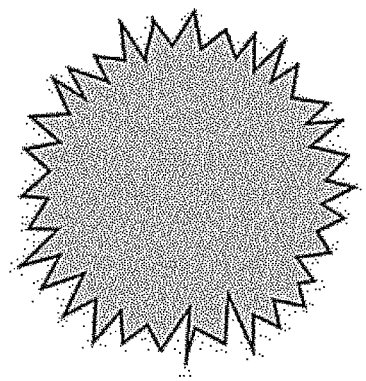
FIGS. 1A and 1B show the actual perimeter and convex hull perimeter, respectively, of the object to be analyzed.
Figure 1B:
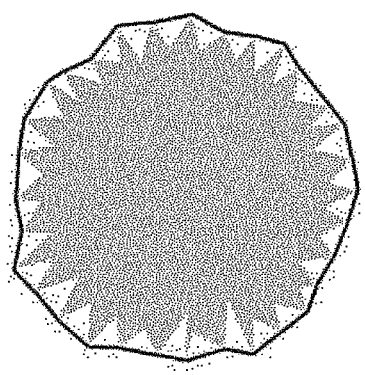

The convex hull perimeter may mean the length of a rubber band when the object to be analyzed is surrounded by the rubber band. For example, referring to FIGS. 1A and 1B, the black line in FIG. 1A represents an actual perimeter (P), and the black line in FIG. 1B represents a convex hull perimeter ($P_c$). As such, the convexity is a variable related to surface roughness and a specific surface area and is different from sphericity which is related to the macroscopic shape of the whole particle. For example, even for macroscopically spherical particles, when the spherical particle surface is very rough, convexity may be less than 0.8.

The current collector is not particularly limited as long as it does not cause a chemical change in the battery and has conductivity. For example, copper, stainless steel, aluminum, nickel, titanium, calcined carbon, aluminum or stainless steel whose surface has been treated with carbon, nickel, titanium, silver, or the like, or the like may be used as the current collector. Specifically, a transition metal that satisfactorily adsorbs carbon, such as copper or nickel, may be used as the current collector. The current collector may have a thickness of from 6 μm to 20 μm, but the thickness of the current collector is not limited thereto.

The negative electrode active material layer is disposed on the current collector. The negative electrode active material layer may be disposed on at least one surface of the current collector, specifically, on one surface or both surfaces of the current collector.

The negative electrode active material layer may include a conductive material, a negative electrode active material, and a binder.

The conductive material is not particularly limited as long as it does not cause a chemical change in the battery and has conductivity. For example, graphite such as natural graphite, artificial graphite, or the like; carbon black such as acetylene black, Ketjen black, channel black, furnace black, lamp black, thermal black, or the like; a conductive fiber such as carbon fiber, metal fiber, or the like; a conductive tube such as carbon nanotubes or the like; fluorocarbon; metal powder such as aluminum powder, nickel powder, or the like; a conductive whisker such as zinc oxide, potassium titanate, or the like; a conductive metal oxide such as titanium oxide or the like; or a conductive material such as a polyphenylene derivative or the like may be used as the conductive material.

The negative electrode active material may include a silicon-based active material having a convexity of 0.8 or more, specifically, 0.9 or more, as measured using a particle shape analyzer. The upper limit of the convexity may be 1.0. Also, the convexity is defined by the following Formula 1.

Convexity($C_x$)=Convex hull perimeter($P_c$)/Actual perimeter($P$)     [Formula 1]

The convexity may be obtained, for example, by dispersing a silicon-based active material sample (1 mm³) under conditions of 4 bar and 10 ms, then capturing silicon-based active material particles as a two-dimensional image, and analyzing the image using a particle shape analyzer (Morphologi 4 commercially available from Malvern Panalytical Ltd.). Also, the convexity may be a convexity corresponding to 50% of the cumulative volume of 10,000 silicon-based active material particles.

When the convexity of the silicon-based active material satisfies the above-described range, it is possible to prevent side reactions between the silicon-based active material and an electrolyte solution, and thus the initial efficiency and lifetime characteristics of a battery can be improved. When the convexity of the silicon-based active material is less than 0.8, the specific surface area on which a reaction with an electrolyte solution may take place increases, and thus side reactions with an electrolyte solution excessively take place, leading to the low initial efficiency and deteriorated lifetime characteristics of a battery. Also, the binding characteristic of the electrode may be degraded to decrease adhesion.

The silicon-based active material may be prepared by processing a Si-containing material through a typical pulverization or size classification method known in the art, for example, by using a ball mill, a sieve, or the like. Specifically, the silicon-based active material may be prepared by pulverizing a Si-containing material using a ball mill pulverizer. The Si-containing material may be obtained by thermally treating Si powder, silicon oxide powder, metal powder, or the like under a reduced-pressure atmosphere to cause the reactants in a gas phase to react and cooling the reaction product.

Meanwhile, the convexity of the silicon-based active material may be adjusted by pulverizing a Si-containing material using a ball mill pulverizer whose ball size ranges from 5 mm to 15 mm for 9 hours to 20 hours. Specifically, the convexity of the silicon-based active material may be adjusted by pulverizing a Si-containing material using a ball mill pulverizer whose ball size is 10 mm for 9 hours to 15 hours.

The silicon-based active material may have a BET specific surface area of from 1 m²/g to 60 m²/g. When the BET specific surface area of the silicon-based active material is within the above-described range, it is possible to prevent side reactions between the silicon-based active material and an electrolyte solution, and thus the initial efficiency and lifetime characteristics of a battery can be improved. The specific surface area of the silicon-based active material may be measured by a Brunauer-Emmett-Teller (BET) method. For example, the specific surface area may be measured by the BET 6-point method by the nitrogen gas adsorption flow method using a porosimetry analyzer (BELSORP-mini II commercially available from Bel Japan Inc.).

The silicon-based active material may have an average particle diameter ($D_{50}$) of from 0.01 μm to 30 μm, specifically from 0.05 μm to 20 μm, and more specifically from 0.1 μm to 10 μm. When the average particle diameter of the silicon-based active material satisfies the above-described range, a decrease in the density of the electrode is prevented, and thus appropriate capacity per volume can be achieved, and an electrode-forming slurry can be applied with a uniform thickness.

The silicon-based active material may be included at from 5 wt % to 80 wt % or from 9 wt % to 80 wt % in the negative electrode active material layer. When the content of the silicon-based active material is within the above-described range, the initial efficiency and lifetime characteristics of the negative electrode and battery can be improved.

The silicon-based active material may include $SiO_x$ (0≤x≤2). When the silicon-based active material includes $SiO_x$ (0≤x≤2), battery capacity can be increased. More specifically, the silicon-based active material may be SiO or $SiO_2$. The SiO may be SiO having crystallinity. In this case, the excessive volume expansion of the silicon-based active material during charging and discharging of a battery is controlled, and thus the lifetime characteristics of the battery may be improved. $SiO_x$ (0≤x≤2) may be particles whose average particle diameter ($D_{50}$) is from 1 μm to 15 μm. When the average particle diameter ($D_{50}$) of $SiO_x$ (0≤x≤2) particles is within the above-described range, side reactions between $SiO_x$ and an electrolyte solution are suppressed, and the formation of lithium silicate from $SiO_x$ (0≤x≤2) is controlled, and thus degradation of initial efficiency can be prevented, and initial capacity in electrode design can be maximally implemented.

The silicon-based active material may further include a metal silicate phase. The metal silicate may be formed by doping $SiO_x$ (0≤x≤2) with a metal, and the metal silicate phase means that the metal silicate is present in a domain form in the silicon-based active material. The metal silicate may, for example, be $Mg_2SiO_4$ or $MgSiO_3$. Also, the silicon-based active material may further include a metal silicide and a metal oxide. In this case, the metal silicide may be, for example, $Mg_2Si$, and the metal oxide may be, for example, MgO.

The metal may be an element selected from the group consisting of alkali metals, alkaline earth metals, transition metals, Group 13 elements, Group 14 elements, rare earth elements, and combinations thereof. Specifically, the metal may be one or more selected from among lithium (Li), magnesium (Mg), calcium (Ca), aluminum (Al), sodium (Na), and titanium (Ti) and is preferably Li and/or Mg. In this case, since binding between the metal element and oxygen of the metal silicate is stronger, the formation of lithium silicate from lithium supplied from a positive electrode during initial charging is prevented, and thus degradation of initial efficiency may be prevented.

The metal may be included at from 0.1 wt % to 30 wt %, specifically from 1 wt % to 25 wt %, more specifically from 3 wt % to 20 wt %, and even more specifically from 4 wt % to 15 wt %, in the silicon-based active material. When the content of the metal is within the above-described range, the silicon-based active material may have high capacity, and the initial efficiency of the silicon-based active material may also more effectively increased. The content of the metal may be determined by an inductively coupled plasma (ICP) analysis.

The metal may be in the form of a metal silicate or a metal oxide by reacting with silicon-based particles included in the silicon-based active material, specifically, $SiO_x$ (0≤x≤2) particles. Therefore, the silicon-based active material according to an embodiment of the present invention may include $SiO_x$(0≤x≤2), and a metal compound phase including one or more selected from a metal oxide and a metal silicate.

The metal silicate may include a metal silicate of one or more selected from among the doping metals Li, Mg, Ca, Al, Na, and Ti. Specifically, the metal silicate includes a metal silicate of one or more selected from Li and Mg and more specifically includes magnesium (Mg) silicate.

The metal oxide may include a metal oxide of one or more selected from among the doping metals Li, Mg, Ca, Al, Na, and Ti. Specifically, the metal oxide includes a metal oxide of one or more selected from Li and Mg and more specifically includes magnesium (Mg) oxide.

The metal compound including one or more selected from the metal oxide and the metal silicate may be one or more metal compounds selected from among $Mg_2SiO_4$, $MgSiO_3$, $Mg_2Si$, and MgO.

The silicon-based active material may further include a carbon coating layer on the surface thereof. Specifically, the silicon-based active material may further include a carbon coating layer on the surface of $SiO_x$ (0≤x≤2). The carbon coating layer may cover at least a portion of the surface of the silicon-based active material.

The carbon coating layer may allow the excessive volume expansion of the silicon-based active material during charging and discharging of a battery to be more effectively controlled and may increase the conductivity of the active material to further reduce the resistance of the negative electrode. In addition, when the carbon coating layer is included, the surface hardness of the silicon-based active material may be further increased, and the electrical conductivity of the silicon-based active material is enhanced so that charging and discharging uniformly occur, and thus a volume change during charging and discharging may be more effectively controlled.

The silicon-based active material further including the carbon coating layer on the surface thereof may have a BET specific surface area of from 0.5 $m^2$/g to 15 $m^2$/g. Specifically, the silicon-based active material may have a BET specific surface area of from 1 $m^2$/g to 13 $m^2$/g. When the BET specific surface area of the silicon-based active material further including the carbon coating layer on the surface thereof is within the above-described range, it is possible to prevent side reactions between the silicon-based active material and an electrolyte solution, and thus the initial efficiency and lifetime characteristics of a battery can be improved.

The silicon-based active material may include the carbon coating layer on the surface thereof at from 0.1 wt % to 50 wt %, specifically from 1 wt % to 25 wt %, and more specifically from 3 wt % to 15 wt %, with respect to the total weight of the silicon-based active material. When the content of the carbon coating layer satisfies the above-described range, the electrical conductivity of the silicon-based active material is enhanced so that charging and discharging uniformly occur, and thus a volume change during charging and discharging can be more effectively controlled.

The carbon coating layer may have a thickness of from 1 nm to 200 nm, and specifically from 5 nm to 100 nm. When the thickness of the carbon coating layer satisfies the above-described range, the electrical conductivity of the negative electrode can be enhanced while maintaining a conductive path in the negative electrode active material.

The negative electrode active material may further include a carbon-based negative electrode active material. The carbon-based negative electrode active material may include at least one selected from the group consisting of artificial graphite, natural graphite, and graphitized mesocarbon microbeads. Specifically, the carbon-based active material is preferably artificial graphite.

When the negative electrode active material includes both a silicon-based active material and a carbon-based negative electrode active material, the silicon-based active material and the carbon-based negative electrode active material may be included in a weight ratio of 3:97 to 20:80, 5:95 to 20:80, or 10:90 to 20:80. When the weight ratio of the silicon-based active material and the carbon-based negative electrode active material satisfies the above-described range, battery capacity can be improved, and the volume change of the negative electrode active material, which may occur during charging and discharging of the negative electrode, can be suppressed to improve the lifespan of the negative electrode.

The binder may include at least one selected from the group consisting of a polyvinylidene fluoride-hexafluoropropylene copolymer (PVDF-co-HFP), polyvinylidene fluoride, polyacrylonitrile, polymethyl methacrylate, polyvinyl alcohol, carboxymethylcellulose (CMC), starch, hydroxypropylcellulose, regenerated cellulose, polyvinylpyrrolidone, tetrafluoroethylene, polyethylene, polypropylene, polyacrylic acid, an ethylene-propylene-diene monomer (EPDM), a sulfonated EPDM, styrene butadiene rubber (SBR), fluoro-rubber, polyacrylic acid, and materials in which hydrogens thereof have been substituted with Li, Na, Ca, or the like, and also include various copolymers thereof.

The binder may be included at 30 wt % or less, and specifically from 0.1 wt % to 30 wt %, in the negative electrode active material layer. When the content of the binder satisfies the above-described range, an adhesion effect resulting from the use of the binder can be exhibited, and a desired capacity per volume of the negative electrode can be maintained.

<Secondary Battery>

A secondary battery according to another embodiment of the present invention includes a negative electrode, and the negative electrode is the same as the above-described negative electrode.

Specifically, the secondary battery may include: the negative electrode; a positive electrode; a separator interposed between the positive electrode and the negative electrode; and an electrolyte, and the negative electrode is the same as the above-described negative electrode. Since the negative electrode has been described above, detailed descriptions thereof will be omitted.

The positive electrode may include: a positive electrode current collector; and a positive electrode active material layer formed on the positive electrode current collector and including a positive electrode active material.

In the positive electrode, the positive electrode current collector is not particularly limited as long as it does not cause a chemical change in the battery and has conductivity. For example, stainless steel, aluminum, nickel, titanium, calcined carbon, or aluminum or stainless steel whose surface has been treated with carbon, nickel, titanium, silver, or the like may be used as the positive electrode current collector. In addition, the positive electrode current collector may typically have a thickness of from 3 μm to 500 μm and have fine irregularities formed on the surface thereof to increase the adhesion of a positive electrode active material. Additionally, the positive electrode current collector may be used in any of various forms such as a film, a sheet, a foil, a net, a porous material, a foam, a non-woven fabric, and the like.

The positive electrode active material may be a typically used positive electrode active material. Specific examples of the positive electrode active material include: a layered compound such as a lithium cobalt oxide ($LiCoO_2$), a lithium nickel oxide ($LiNiO_2$), or the like or a compound substituted with one or more transition metals; a lithium iron oxide such as $LiFe_3O_4$; a lithium manganese oxide such as $Li_{1+c1}Mn_{2-c1}O_4$ ($0 \leq c1 \leq 0.33$), $LiMnO_3$, $LiMn_2O_3$, $LiMnO_2$, or the like; a lithium copper oxide ($Li_2CuO_2$); a vanadium oxide such as $LiV_3O_8$, $V_2O_5$, $Cu_2V_2O_7$, or the like; a Ni-site-type lithium nickel oxide represented by the chemical formula $LiNi_{1-c2}M_{c2}O_2$ (here, M is at least one selected from the group consisting of Co, Mn, Al, Cu, Fe, Mg, B, and Ga, and $0.01 \leq c2 \leq 0.3$ is satisfied); a lithium manganese composite oxide represented by the chemical formula $LiMn_{2-c3}M_{c3}O_2$ (here, M is at least one selected from the group consisting of Co, Ni, Fe, Cr, Zn, and Ta, and $0.01 \leq c3 \leq 0.1$ is satisfied) or $Li_2Mn_3MO_8$ (here, M is at least one selected from the group consisting of Fe, Co, Ni, Cu, and Zn); $LiMn_2O_4$ in which some Li ions in the chemical formula have been substituted with alkaline earth metal ions; and the like, but the present invention is not limited thereto. The positive electrode may be a Li metal.

The positive electrode active material layer may include a positive electrode conductive material and a positive electrode binder in addition to the above-described positive electrode active material.

In this case, the positive electrode conductive material is used to impart conductivity to the electrode, and any conductive material that does not cause a chemical change in the battery and has electron conductivity may be used without particular limitation. Specific examples of the conductive material include: graphite such as natural graphite, artificial graphite, or the like; a carbon-based material such as acetylene black, Ketjen black, channel black, furnace black, lamp black, thermal black, carbon fiber, or the like; a metal powder or metal fiber containing copper, nickel, aluminum, silver, or the like; a conductive whisker such as zinc oxide, potassium titanate, or the like; a conductive metal oxide such as titanium oxide or the like; and a conductive polymer such as a polyphenylene derivative or the like, which may be used alone or in combination of two or more thereof.

In addition, the positive electrode binder serves to improve cohesion between positive electrode active material particles and adhesion between the positive electrode active material and the positive electrode current collector. Specific examples of the binder include polyvinylidene fluoride (PVDF), a vinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, styrene butadiene rubber (SBR), fluoro-rubber, and various copolymers thereof, which may be used alone or in combination of two or more thereof.

The separator serves to separate the negative electrode and the positive electrode and provide the passages through which lithium ions migrate, and any separator typically used as a separator in a secondary battery may be used without particular limitation. In particular, a separator that exhibits low resistance to the migration of electrolyte ions and has an excellent electrolyte impregnation ability is preferred. Specifically, a porous polymer film, for example, a porous polymer film made of a polyolefin-based polymer such as an ethylene homopolymer, a propylene homopolymer, an ethylene/butene copolymer, an ethylene/hexene copolymer, an ethylene/methacrylate copolymer, or the like or a stacked structure having two or more layers thereof, may be used. Alternatively, a typical porous non-woven fabric, for example, a non-woven fabric made of high-melting-point glass fiber, polyethylene terephthalate fiber, or the like may be used. Alternatively, a coated separator including a ceramic component or a polymer material to ensure heat resistance or mechanical strength may be used, and optionally, the separator may be used in a single-layer or multi-layer structure.

Examples of the electrolyte include an organic liquid electrolyte, an inorganic liquid electrolyte, a solid polymer electrolyte, a gel-type polymer electrolyte, an inorganic solid electrolyte, a molten-type inorganic electrolyte, and the like, which are usable in the manufacture of a lithium secondary battery, but the present invention is not limited thereto.

Specifically, the electrolyte may include a non-aqueous organic solvent and a metal salt.

As the non-aqueous organic solvent, for example, an aprotic organic solvent such as N-methyl-2-pyrrolidinone, propylene carbonate, ethylene carbonate, butylene carbonate, dimethyl carbonate, diethyl carbonate, γ-butyrolactone, 1,2-dimethoxyethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphate triester, trimethoxy methane, dioxolane derivatives, sulfolane, methyl sulfolane, 1,3-dimethyl-2-imidazolidinone, propylene carbonate derivatives, tetrahydrofuran derivatives, ethers, methyl propionate, ethyl propionate, or the like may be used.

Among the carbonate-based organic solvents, especially, ethylene carbonate and propylene carbonate, which are cyclic carbonates, are preferably used because they are high-viscosity organic solvents and have high permittivity, thereby satisfactorily dissociating a lithium salt. When a mixture formed by mixing such cyclic carbonates with low-viscosity, low-permittivity linear carbonates such as dimethyl carbonate and diethyl carbonate in an appropriate ratio is used, an electrolyte having high electrical conductivity may be prepared. Therefore, the mixture is more preferably used.

As the metal salt, a lithium salt may be used, and the lithium salt is a substance that is easy to dissolve in the non-aqueous electrolyte solution. For example, as an anion of the lithium salt, one or more selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3$, $CF_3CO_2^-$, $CH_3CO_2^-$, $SCN^-$, and $(CF_3CF_2SO_2)_2N^-$ may be used.

In addition to the above-described electrolyte components, the electrolyte may further include one or more additives selected from among a haloalkylene carbonate-based compound such as difluoroethylene carbonate and the like, pyridine, triethylphosphite, triethanolamine, cyclic ether, ethylenediamine, n-glyme, hexaphosphoric triamide, a nitrobenzene derivative, sulfur, a quinone imine dye, an N-substituted oxazolidinone, an N,N-substituted imidazolidine, an ethylene glycol dialkyl ether, an ammonium salt, pyrrole, 2-methoxyethanol, aluminum trichloride, and the like for the purpose of improving the lifetime characteristics of the battery, suppressing a reduction in battery capacity, improving the discharge capacity of the battery, and the like.

According to still another embodiment of the present invention, provided are a battery module including the above-described secondary battery as a unit cell and a battery pack including the same. Since the battery module and the battery pack include the secondary battery having high capacity, high rate characteristics, and cycle characteristics, they may be used as power sources of medium-to-large-sized devices selected from the group consisting of electric vehicles, hybrid electric vehicles, and plug-in hybrid electric vehicles, and a system for storing electric power.

Hereinafter, exemplary embodiments of the present invention will be described to facilitate understanding of the present invention. However, it is apparent to those skilled in the art that the exemplary embodiments proposed herein are intended to illustrate the present invention, and various changes and modifications can be made within the scope and technical spirit of the present invention, so that the present invention covers all such changes and modifications provided they are within the scope of the appended claims.

PREPARATION EXAMPLES: PREPARATION OF SILICON-BASED ACTIVE MATERIAL

Preparation Example 1

Powder including Si powder and silicon oxide ($SiO_2$) powder uniformly mixed in a molar ratio of 1:1 and magnesium (Mg) were thermally treated under a reduced-pressure atmosphere at 1400° C. and 700° C., respectively, so that a silicon oxide vapor and a magnesium vapor were generated from the Si and the silicon oxide at the same time to cause the reactants in a gas phase to react. The reaction product was cooled to induce precipitation, and then pulverization was performed by a ball mill using a 10-mm ball for 10 hours. Afterward, size classification was performed to collect a silicon-based active material having an average particle diameter ($D_{50}$) of 5 μm and including $MgSiO_3$ and $Mg_2SiO_4$.

The collected silicon-based active material was input into a tubular furnace and subjected to chemical vapor deposition (CVD) under a mixed gas of argon and methane to prepare a silicon-based active material including a carbon coating layer having a carbon content of 5 wt % formed on the surface thereof.

As a result of performing an inductively coupled plasma (ICP) analysis to determine the Mg content of the prepared silicon-based active material, it was found that the Mg content was 8 wt % with respect to the total weight of the silicon-based active material.

The convexity corresponding to 50% of the cumulative volume of 10,000 silicon-based active material particles was 0.89 as obtained by dispersing the silicon-based active material sample (1 mm³) under conditions of 4 bar and 10 ms, then capturing silicon-based active material particles as a two-dimensional image, and analyzing the image using a particle shape analyzer (Morphologi 4 commercially available from Malvern Panalytical Ltd.).

Preparation Examples 2 to 4

Silicon-based active materials were prepared in the same manner as in Preparation Example 1 except that pulverization was performed by a ball mill for 14 hours, 8 hours, and 6 hours, respectively.

The convexities corresponding to 50% of the cumulative volume of 10,000 silicon-based active material particles were 0.97, 0.75, and 0.69, respectively, as obtained by dispersing the silicon-based active material samples (1 mm³) prepared in Preparation Examples 2 to 4 under conditions of 4 bar and 10 ms, then capturing silicon-based active material particles as a two-dimensional image, and analyzing the image using a particle shape analyzer (Morphologi 4 commercially available from Malvern Panalytical Ltd.).

EXAMPLES AND COMPARATIVE EXAMPLES

Example 1

The silicon-based active material having a convexity of 0.89, which was prepared in Preparation Example 1, as a negative electrode active material, carbon black as a conductive material, and polyacrylic acid (PAA) as a binder were mixed in a weight ratio of 80:10:10 in water ($H_2O$) as a solvent to prepare a uniform negative electrode slurry. The negative electrode slurry was applied onto one surface of a copper current collector, dried, and roll-pressed, and then the resultant was punched in a constant size to manufacture a negative electrode.

A Li metal was used as a counter electrode, a polyolefin separator was interposed between the negative electrode and the Li metal, and then an electrolyte prepared by dissolving 1M $LiPF_6$ in a solvent containing ethylene carbonate (EC) and diethyl carbonate (DEC) mixed in a volume ratio of 30:70 was injected, thereby manufacturing a coin-type half-cell of Example 1.

Example 2

A coin-type half-cell of Example 2 was manufactured in the same manner as in Example 1 except that the silicon-based active material having a convexity of 0.97, which was prepared in Preparation Example 2, was used as a negative electrode active material.

Example 3

A negative electrode active material including the silicon-based active material having a convexity of 0.89, which was prepared in Preparation Example 1, and natural graphite mixed in a weight ratio of 1:9, carbon black as a conductive material, and carboxymethylcellulose and styrene butadiene rubber (SBR) as binders were mixed in a weight ratio of 95.4:1:1.1:2.5 in water ($H_2O$) as a solvent to prepare a uniform negative electrode slurry. The negative electrode slurry was applied onto one surface of a copper current collector, dried, and roll-pressed, and then the resultant was punched in a constant size to manufacture a negative electrode.

A positive electrode including $Li[Ni_{0.6}Co_{0.2}Mn_{0.2}]O_2$ as a positive electrode active material was used as a counter electrode, a polyolefin separator was interposed between the negative electrode and the positive electrode, and then an electrolyte prepared by dissolving 1M $LiPF_6$ in a solvent containing ethylene carbonate and diethyl carbonate mixed in a volume ratio of 30:70 was injected, thereby manufacturing a bi-cell-type lithium secondary battery of Example 3.

Example 4

A bi-cell-type lithium secondary battery of Example 4 was manufactured in the same manner as in Example 3 except that a negative electrode active material including the silicon-based active material having a convexity of 0.97, which was prepared in Preparation Example 2, and natural graphite mixed in a weight ratio of 1:9 was used.

Comparative Example 1

A coin-type half-cell of Comparative Example 1 was manufactured in the same manner as in Example 1 except that the silicon-based active material having a convexity of 0.75, which was prepared in Preparation Example 3, was used as a negative electrode active material.

Comparative Example 2

A coin-type half-cell of Comparative Example 2 was manufactured in the same manner as in Example 1 except that the silicon-based active material having a convexity of 0.69, which was prepared in Preparation Example 4, was used as a negative electrode active material.

Comparative Example 3

A bi-cell-type lithium secondary battery of Comparative Example 3 was manufactured in the same manner as in Example 3 except that a negative electrode active material including the silicon-based active material having a convexity of 0.75, which was prepared in Preparation Example 3, and natural graphite mixed in a weight ratio of 1:9 was used.

Comparative Example 4

A bi-cell-type lithium secondary battery of Comparative Example 4 was manufactured in the same manner as in Example 3 except that a negative electrode active material including the silicon-based active material having a convexity of 0.69, which was prepared in Preparation Example 4, and natural graphite mixed in a weight ratio of 1:9 was used.

EXPERIMENTAL EXAMPLES

Experimental Example 1: Evaluation of Discharge Capacity and Initial Efficiency

Each of the coin-type half-cells of Examples 1 and 2 and Comparative Examples 1 and 2 was charged at 25° C. with a constant current (CC) of 0.1 C up to 5 mV and then subjected to 1st charging that was performed with constant voltage (CV) up to a charge current of 0.005 C (cut-off current). After maintaining the cell for 20 minutes and then performing discharging with a constant current (CC) of 0.1 C up to 1.5 V, discharge capacity (mAh/g) and initial efficiency (%) were evaluated, and results thereof are shown in the following Table 1. Initial efficiency (%) was calculated by the following Formula 2.

Initial efficiency(%)=(Discharge capacity after 1st discharging/Initial charge capacity)×100  [Formula 2]

TABLE 1

| | Discharge capacity (mAh/g) | Initial efficiency (%) |
|---|---|---|
| Example 1 | 1403 | 81.8 |
| Example 2 | 1414 | 82.1 |
| Comparative Example 1 | 1385 | 80.9 |
| Comparative Example 2 | 1367 | 79.2 |

Referring to Table 1, it can be seen that the cells of Examples 1 and 2, which included a silicon-based active material having a convexity of 0.8 or more, exhibited excellent initial efficiency and excellent discharge capacity due to prevention of side reactions with an electrolyte solution, as compared to the cells of Comparative Examples 1 and 2 which included a silicon-based active material having a convexity of less than 0.8.

Experimental Example 2: Evaluation of Capacity Retention Rate and Electrode Thickness Increase Rate Each of the bi-cell-type lithium secondary batteries of Examples 3 and 4 and Comparative Examples 3 and 4 was charged and discharged. Then, a capacity retention rate and an electrode thickness increase rate were evaluated, and results thereof are shown in Table 2 below.

Specifically, each of the bi-cell-type lithium secondary batteries of Examples 3 and 4 and Comparative Examples 3 and 4 was charged at 25° C. with a constant current (CC) of 1 C up to 4.25 V and then subjected to 1st charging that was performed with constant voltage (CV) up to a charge current of 0.05 C (cut-off current). After maintaining the battery for 20 minutes, the battery was discharged with a constant current (CC) of 1 C up to 2.5 V. This cycle was repeated 50 times, and then a capacity retention rate was evaluated, and after the $51^{th}$ charging, the thickness of the electrode was measured, and a thickness increase rate was evaluated. A capacity retention rate and an electrode thickness variation were calculated by the following Formulas 3 and 4, respectively.

Capacity retention rate (%)=(Discharge capacity after $45^{th}$ cycle/Discharge capacity at $1^{st}$ cycle)× 100     [Formula 3]

Electrode thickness variation(%)=(Final negative electrode thickness variation/Initial negative electrode thickness)×100     [Formula 4]

Experimental Example 3: Evaluation of Adhesion of Electrode

Before the batteries were manufactured in Examples 3 and 4 and Comparative Examples 3 and 4, the adhesion of the manufactured negative electrode was measured, and results thereof are shown in Table 2 below.

Specifically, a double-sided adhesive tape was applied onto a slide glass, and each of the negative electrodes of Examples 3 and 4 and Comparative Examples 3 and 4, which had been punched into a size of 20 mm×180 mm, was placed thereon and then allowed to adhere thereto by roll pressing back and forth (one round trip) 10 times using a 2-kg roller. Afterward, a force applied when the electrode was peeled off from the slide glass while being pulled at 20 mm/min was measured using a universal testing machine (UTM; TA Instruments). In this case, the measured angle between the slide glass and the negative electrode was 90°.

TABLE 2

| | Capacity retention rate (%) | Electrode thickness variation (%) | Adhesion of electrode (gf/20 mm) |
|---|---|---|---|
| Example 3 | 90.3 | 53.2 | 31 |
| Example 4 | 92.7 | 51.8 | 35 |
| Comparative Example 3 | 87.6 | 60.4 | 23 |
| Comparative Example 4 | 85.4 | 65.9 | 18 |

Referring to Table 2, it can be seen that the secondary batteries of Examples 3 and 4, which included a silicon-based active material having a convexity of 0.8 or more, exhibited excellent capacity retention rates, low electrode thickness variations, and excellent adhesion of the electrode compared to the secondary batteries of Comparative Examples 3 and 4 which included a silicon-based active material having a convexity of less than 0.8. Accordingly, it can be seen that, since the secondary battery including a silicon-based active material having a convexity of 0.8 or more has a relatively small specific surface area, few side reactions with an electrolyte solution on the active material surface may occur, and the binder may be appropriately positioned at the same binder content, resulting in efficiently maintaining the shape of the electrode during charging and discharging. For this reason, it can be seen that the secondary battery including a silicon-based active material having a convexity of 0.8 or more exhibits a low electrode thickness variation and a high capacity retention rate during charging and discharging.

The invention claimed is:

1. A negative electrode comprising:
a current collector; and
a negative electrode active material layer disposed on the current collector,
wherein the negative electrode active material layer includes a conductive material, a negative electrode active material, and a binder,
the negative electrode active material includes a silicon-based active material having a convexity of 0.8 or more and 0.97 or less as measured using a particle shape analyzer, and
the convexity is defined by the following Formula 1:

Convexity=Convex hull perimeter/Actual perimeter     Formula 1 wherein the convex hull perimeter is a total length of sides of the smallest convex polygon that contains all surface roughness points of particles of the silicon-based active material measured from a two-dimensional image thereof.

2. The negative electrode of claim 1, wherein the silicon-based active material has a convexity of 0.9 or more and 0.97 or less.

3. The negative electrode of claim 1, wherein the silicon-based active material has a BET specific surface area of from 1 m²/g to 60 m²/g.

4. The negative electrode of claim 1, wherein the silicon-based active material includes $SiO_x$ (0≤x≤2).

5. The negative electrode of claim 1, wherein the silicon-based active material includes a metal silicate phase including a metal silicate.

6. The negative electrode of claim 5, wherein the metal silicate includes one or more selected from the group consisting of lithium, magnesium, calcium, aluminum, sodium, and titanium.

7. The negative electrode of claim 5, wherein the metal silicate includes a metal that is included at from 0.1 wt % to 30 wt % in the silicon-based active material.

8. The negative electrode of claim 1, wherein the silicon-based active material is included at from 5 wt % to 80 wt % in the negative electrode active material layer.

9. The negative electrode of claim 1, wherein the silicon-based active material includes a carbon coating layer on a surface thereof.

10. A secondary battery comprising the negative electrode according to claim 1.

* * * * *